United States Patent Office 3,553,173
Patented Jan. 5, 1971

3,553,173
ELASTOMERIC FILAMENTS AND FIBERS WITH AN IMPROVED AFFINITY FOR DYES
Horst Wieden and Wolfgang Rellensmann, Dormagen, Hans Holtschmidt, Leverkusen-Steinbuchel, Ernst Roos, Cologne-Flittard, and Gunther Nischk, Leverkusen, Germany, assignors to Farbenfabriken Bayer Aktiengesellschaft, Leverkusen, Germany, a corporation of Germany
No Drawing. Filed Apr. 22, 1966, Ser. No. 544,382
Claims priority, application Germany, Apr. 24, 1965, F 45,903
Int. Cl. C08g 22/16, 51/44
U.S. Cl. 260—77.5
10 Claims

ABSTRACT OF THE DISCLOSURE

Elastomeric filaments are prepared from a polyurethane polymer which is the reaction product of an NCO terminated prepolymer and a chain extending composition comprised of a low molecular weight active hydrogen containing compound and a linear polyether glycol having oxygen and tertiary nitrogen atoms in the chain and a molecular weight of from 500 to 15,000.

---

This invention relates to the production of highly elastic filamentary material from segmented polyurethanes having a high affinity to dyes, as well as excellent elastic properties. The invention also provides a process for the production of polyurethane fibers which may be simultaneously dyed both with acid and with basic dyes.

There are already several different processes in which segmented, high molecular weight elastic polyurethane adducts prepared in the presence of solvents by the isocyanate-polyaddition process, are spun into filaments of fibres. Fairly high molecular weight polyhydroxyl compounds such as linear or weakly branched polyesters, polyester amides, polyethers, polythioethers or polyacetals containing hydroxyl groups, are thereafter initially reacted with aliphatic or aromatic diisocyanates in excess to form pre-adducts with free isocyanate groups. These isocyanate-modified polyhydroxyl compounds are then reacted in solvents with low molecular weight bifunctional chain extenders, for example water, glycols, aminoalcohols, hydrazine (hydrate), diamines or dihydrazides.

High molecular weight solutions prepared by this process are then formed into elastomeric filaments or fibres by any one of a number of spinning methods. These filaments or fibers exhibit the known properties such as high ultimate tensile strength, low permanent elongation and high modulus of elasticity. For this reason, they cannot be satisfactorily dyed with acid and basic dyes. It is therefore not possible to dye mixtures of these elastic fibers and the conventional synthetic fibers which can be highly satisfactorily dyed with acid or basic dyes, by a single-or one-bath process. It is however, known that the affinity of the elastic fibers for acid dyes can be improved by adding basic components such as, for example, homopolymers of methacrylic acid-($\beta$-dimethylamino)-ethyl ester, to the elastomer solutions prior to spinning. It is possible to obtain from solution prepared in this way elastomer filaments which can be dyed with synthetic fibres receptive to acid dyes, for example polyamide fibers, by the one-bath process. Unfortunately, these elastomer filaments exhibit a higher permanent elongation than filaments which do not contain any basic homopolymers.

An advantageous method has now been found for the production of highly elastic, dye-receptive polyurethane filamentary material such as threads, filaments or fibres by spinning a solution of a polyurethane which is a reaction-product of a substantially linear polyhydroxyl compound with a diisocyanate and a low molecular weight chain extender such as water, a glycol, an aminoalcohol, hydrazine, a diamine or a dihydrazide. The linear polyhydroxyl compound having a hydroxyl-number of 35 to 120 being reacted at temperatures below 150° C. with an excess of up to 300%, based on the number of hydroxyl groups present, of a diisocyanate, optionally in the presence of low molecular weight dialcohols, and the reaction product, following its dissolution in a polar organic solvent, being further reacted at —10 to +100° C. with a quantity of preferably 80 to 130%, based on the number of NCO groups left in the reaction product, of chain extenders, by simultaneously employing as co-chain extenders with the usual low molecular weight chain extenders, linear, poly-condensation products with molecular weights in the range from 500 to 15,000 which are bifunctional with respect to isocyanates and which, in the molecule chain, contain oxygen atoms and tertiary nitrogen atoms, up to 90% of which may quaternised by monofunctional sulphuric acid esters, aromatic sulphonic acid esters, aliphatic sultones or alkyl halides, in a quantity of between 1 and 50%, based on free NCO groups in the NCO-containing pre-adducts.

To carry out the process, polyhydroxyl compounds with an OH number of from 35 to 120, preferably from 40 to 70, are reacted as known per se with excess aliphatic or aromatic diisocyanates at a temperature below 150° C., either in the melt or in inert solvents such as methylene chloride, tetrahydrofuran, dioxan, benzene, chlorobenzene, optionally in admixture with low molecular weight dialcohols such as, for example, butane diol. The diisocyanate may be used in an excess of up to 300%, based on the number of hydroxyl groups present, so that, in addition to the isocyanate-modified polyhydroxyl compound, fre diisocyanate is still present in the melt. Suitable polyhydroxyl compounds are polyesters, polyester amides, polyethers, polythioethers and polyacetals which carry terminal hydroxyl groups and are substantially linear in structure. The melting point of these compounds is preferably intended below 60° C., because otherwise the elastic properties of the end products would deteriorate, particularly at low temperature.

The linear polyesters containing hydroxyl groups which are used as the starting material, may be prepared in known manner by condensing dicarboxylic acids and diols at elevated temperature. Their acid numbers are generally below 10 and preferably from 0 to 3. Succinic acid, adipic acid, pimelic acid, acelaic acid, sebacic acid, thiodibutyric acid and sulphonyl dibutyric acid, are mentioned as examples of suitable dicarboxylic acids for these polyesters. Suitable glycols are, for example, ethylene glycol, diethylene glycol, 1,2-propane diol, 1,4-butane diol, 1,3-butane diol, 1,6-hexane diol, hexahydro-p-xylylene glycol, 2,2-dimethyl-1,3-propane diol as well as their alkoxylation products. Polyesters of lactones, for example ε-caprolactone, may also be used to advantage as starting materials. Similarly, usable polyesteramides may be obtained by incorporating aminoalcohols such as ethanolamine or porpanolamine or diamines such as hexamethylene diamine or poperazine in polyesters. Polyethylene glycol ether, polypropylene glycol ether, polytetramethylene glycol ether or polyhexamethylene glycol ether are examples of suitable polyethers. The polythioethers which can be used as starting materials may be obtained in known manner from thiodiglycols, whilst the polyacetals are obtained by reacting glycols with formaldehyde, or from cyclic acetals. Suitable diisocyanates for the aforementioned reaction include, for example, p-phenylene diisocyanate, 1,5-naphthylene diisocyanate, diphenylmethane-4,4'-diisocyanate, 3,3'-dimethyldiphenylmethane - 4,4' - diisocyanate, 2,2-bis-(4-isocyanatophenyl)-propane, 4,4' - diisocyanato stilbene, 4,4'-diisocyantodibenzyl. Mixtures of 2,4- and 2,6-toluylene diisocyanate and hexamethylene diisocyanate may also be used. Diphenylmethane-4,4'-diisocyanate, the isomeric toluylene diisocyanates and hexamethylene diisocyanate are particularly suitable.

The isocyanate-modified polyhydroxyl compounds containing free isocyanate groups prepared in this way are then dissolved in solvents and reacted at a temperature of from $-10°$ to $+100°$ C., preferably at 10 to 60° C., with the linear polycondensation products with molecular weights of from 500 to 15,000 which are bifunctional with respect to isocyanates and which, in the molecule chain, contain oxygen atoms and tertiary nitrogen atoms up to 90% of which may quaternised by monofunctional sulphuric acid esters, aromatic sulphonic acid esters, aliphatic sultones or alkyl halides. Hereinafter, these polycondensation products will be briefly referred to as "basic polyethers." Although the reaction with the low molecular weight extenders with a molecular weight of lower than 500, preferably 300, such as water, glycols, aminoalcohols, diamines, dihydrazides or hydrazine, can be carried out simultaneously, it is preferably carried out after the reaction has been in progress for a certain period. Depending on the low molecular weight extender used, the polycondensation product containing oxygen atoms and tertiary nitrogen, plus the low molecular weight extender, are used in quantities of from 80 to 130%, based on the free isocyanate groups still present in the isocyanate-modified polyhydroxyl compound. The component of co-extender, i.e. the polycondensation product containing oxygen atoms and tertiary nitrogen atoms, or the polycondensation product quaternised by up to 90% at the tertiary nitrogen atoms with monofunctional sulphuric acid esters, aromatic sulphonic acid esters, aliphatic sultones or alkyl halides, amounts between 1 and 50 mol percent, preferably 3 to 25 mol percent in addition to the usual low molecular weight chain extenders.

In another embodiment of the process, the basic polyethers may also be immediately added to the NCO-containing pre-adduct in the melt, followed by the further reaction with the low molecular weight chain extenders in the solvent. Organic, so-called polyacrylonitrile solvents such as dimethyl formamide, dimethyl acetamide, dimethyl sulphoxide, dimethoxy-dimethyl acetamide, are used as the solvents. They must not contain any components which can react with diisocyanates. These highly polar solvents may contain other inert solvents such as, for example, dioxan, tetrahydrofuran or chlorobenzene, in much smaller quantities (up to about 20% by weight).

Suitable low molecular weight extenders, apart from water, are glycols such as p-phenylene-bis-β-hydroxy ethylether, 1,5-naphthylene-bis-β-hydroxy ethylether, 1,4-butane diol, aminoalcohols such as ethanolamine, diamines such as piperazine, ethylene diamine, N-methyl propylene diamine, acid hydrazides such as carbodihydrazide, adipic acid dihydrazide, sebacic acid dihydrazide or hydrazine hydrate. The diamines or the hydrazine may advantageously be used in the form of their $CO_2$-adducts. The linear, basic polyethers with molecular weights of between 500 and 15,000 which are bifunctional with respect to isocyanates and which are used as the co-extenders, are products which are obtained by condensing N,N-bis-β-hydroxy alkyl derivatives of monovalent primary amines, or N,N-bis-β-hydroxy alkyl derivatives of bivalent secondary amines, optionally by co-condensation with suitable diols such as ethylene glycol, diethylene glycol, 1,6-hexane diol, in the presence of phosphorous acid or its derivatives, or in the presence of phosphonic acids or their derivatives, at temperatures in the range from 120 to 280° C. with elimination of water.

N,N-bis-β-hydroxy alkyl derivatives of monovalent primary amines or N,N'-bis-β-hydroxy alkyl derivatives of bivalent secondary amines which are suitable for the preparation of the linear, basic polyethers which are bifunctional with respect to isocyanates, can be obtained by adding 2 mols of ethylene oxide, propylene oxide, butylene oxide, or, if desired, mixtures of these alkylene oxides to the aforementioned, amines, in which case the following amines, for example, could be used as the starting compounds: primary aliphatic amines with from 1 to 18 carbon atoms in which the carbon chain may be branched or may contain C—C-double bonds, such as methyl, ethyl, butyl, isobutyl, dodecyl, stearyl, allyl, β-cyanoethyl amine; primary cycloaliphatic amines such as cyclohexyl amine, 4-phenyl cyclohexyl amine; primary araliphatic amines such as benzyl amine, β-phenylethyl amine; primary aromatic amines such as aniline, toluidine, xylidine; primary heterocyclic amines such as amino pyridines, amino quinolines; bivalent aliphatic secondary amines such as N,N'-dimethyl ethylene diamine, N,N'-diethyl ethylene diamine, N,N'-dimethyl propylene diamine, N,N'-dimethyl hexamethylene diamine; bivalent heterocyclic secondary amines such as piperazine.

The basic polyethers quaternised up to 90% at the tertiary nitrogen atoms which are also suitable for use as co-extenders, are prepared by reacting the poly-condensation product containing the tertiary nitrogen atoms in the previously mentioned polyacrylonitrile or inert solvents at temperatures of from 0 to 150° C., preferably from 20 to 100° C., with the required quantity of monofunctional sulphuric acid esters such as dimethyl sulphate, aromatic sulphonic acid esters such as benzene sulphonic acid methyl ester, toluene sulphonic acid ethyl ester, aliphatic sultones such as 1,3-propane sultone, 1,4-butane sultone, 1,3-butane sultone or alkyl halides such as methyl iodide, ethyl or butyl bromide or benzyl chloride.

Depending upon the low molecular weight extender used and upon the reaction conditions, the reaction solutions reach the viscosity level suitable for spinning after a comparatively short or comparatively long time. The elastomer solutions are spun by known processes. In order to obtain an adequate affinity for acid dyes, the elastomers should contain tertiary and quaternary nitrogen atoms in quantities of from 25 to 400 milliequivalents, preferably between 40 and 300 milliequivalents per kg. of elastomer substance. The spinnable solutions exhibit satisfactory stability at room or slightly elevated temperature. They are spun into elastic filaments or fibres, often after pigments such as titanium dioxide or talcum have been added to them, by known dry spinning processes, i.e. at elevated temperature in the presence of air or inert gases, or wet spinning processes, i.e. by spraying them into coagulation baths. Elastomeric filaments or fibres are obtained which exhibit excellent properties, i.e. high ultimate tensile strength, low permanent elongation and high modulus of elasticity. They are particularly distinguished by their high affinity for acid dyes, as a result of which mixtures of these filaments or fibres with synthetic fibres receptive to acid dyes such as, for example, polyamide fibres, may be readily dyed by the one-bath process.

Even fibres which are only receptive to basic dyes may be dyed together with the elastomer filaments or fibres according to the invention with an affinity for acid dyes, with satisfactory blending of the colours, by the one-bath processes providing the dye bath contains both basic and acid dyes.

According to the invention, the affinity of the elastomer fibres both for acid and for basic dyes together required for the universal application, can be obtained by using the polycondensation products quaternised at the tertiary nitrogen atoms with aliphatic sultones as co-extenders. The polyurethan elastomers synthesised from these products by the process according to the invention would in this case contain sulphobetaine groupings ($SO_3$-groups linked via an alkylene group to a quaternary nitrogen atom) which are receptive both to basic dyes and to acid dyes. In cases where a high receptivity to basic dyes is required, the elastomer fibre should contain some 2 to 300, preferably 20 to 200, milliequivalents of $SO_3$-groups

EXAMPLE 1

250 parts of a polyester of adipic acid, 1,6-hexane diol and 2,2-dimethyl-1,3-propane diol (weight ratio of the glycols 65/35: OH number 55.5: acid number 0.8) are dehydrated for one hour at 110° C./12 mm. Hg pressure, and then reacted while stirring for 45 minutes at 80 to 85° C. with 93.8 parts of diphenylmethane-4,4'-diisocyanate. The melt consisting of polyester diisocyanate adduct and free diisocyanate is then thoroughly mixed with dimethyl formamide which contains the basic polyether used as the co-extender (Table 1) and the calculated amount of water in dissolved form, in a quantity calculated to produce the required end concentration. The reaction solution is cooled to 50° C. and then left to react further at this temperature.

After a few hours, during which $CO_2$ is given off, the solution has reached the viscosity required for spinning. Further reaction of the clear spinning solution is stopped by adjusting an excess of water, based on free isocyanate groups in the polyester diisocyanate adduct, and by cooling the solution to room temperature.

adduct is dissolved in 947 parts of dimethyl formamide ($H_2O$-content 0.01%), followed by the immediate addition of 40 parts of the solution, described in the following, of the basic polyether quaternised with dimethyl sulphate, and 4 parts of water.

After several hours at 50° C., during which $CO_2$ is given off, the solution reaches the viscosity required for spinning. Further reaction is inhibited by the addition of 2.5 parts of water. The elastomer solution has a solids content of approximately 27%.

Quaternisation of the basic polyether with dimethyl sulphate: 15.1 parts of dimethyl sulphate are added dropwise while stirring to 30 parts of the basic polyether of N-methyl-bis-β-hydroxypropyl amine and 1,6-hexane diol (molar ratio 1:1; molecular weight 1600) in 45.1 parts of dimethyl formamide. The heat of the reaction raises the temperature to 60 to 65° C. Solids content of the solution 50%. Approximately 90% of the tertiary nitrogen atoms are quaternised by dimethyl sulphate, and accordingly 40 parts of the solution contain 53.2 mvals. of quaternary nitrogen and 4.9 mvals. of tertiary nitrogen.

EXAMPLE 4

250 parts of the dehydrated polyester described in Ex-

TABLE I

| Serial No. | Dimethyl-formamide (parts) | Basic polyether of— | Molecular weight | Amounts used (parts) | Amount of $H_2O$ added (parts) | Solids content, percent | Additional amount of water added (parts) |
|---|---|---|---|---|---|---|---|
| 1a | 954 | N-methyl-bis-(β-hydroxypropyl)-amine | 900 | 15 | 3.96 | 27 | 2.5 |
| 1b | 968 | N-methyl-bis-(β-hydroxypropyl)-amine/triethyleneglycol (molar ratio 1:1.5). | 1,070 | 20 | 3.90 | 27 | 2.5 |
| 1c | 969 | N-methyl-bis-(β-hydroxypropyl)amine/1,6-hexanediol (molar ratio 1:1). | 1,600 | 20 | 4.10 | 27 | 2.4 |
| 1d | 981 | ......do...... | 1,600 | 25 | 3.97 | 27 | 2.5 |

EXAMPLE 2

(a) 250 parts of the polyester described in Example 1 are dehydrated for 1 hour at 110° C./12 mm. Hg. The product is then allowed to react for 45 minutes at 85 to 90° C. while stirring with 93.8 parts of diphenyl methane-4,4'-diisocyanate. The melt of the resulting NCO-pre-adduct is dissolved while stirring with a solution of 15 parts of basic polyether of N-cyclohexyl diethanolamine (molecular weight 890) in 900 parts of dimethyl formamide ($H_2O$-content 0.017%) and then cooled to 50° C. After another 20 minutes at 50° C., 3.8 parts of water and 54 parts of dimethyl formamide ($H_2O$-content 0.017%) are added.

After some 6 hours at 50° C., during which $CO_2$ is given off the elastomer solution has reached the viscosity required for spinning. The further reaction is stopped by adding 2.5 parts of water and by cooling the solution to room temperature.

The elastomer solution has a solids content of approximately 27%.

(b) 250 parts of the polyester described in Example 1 and 15 parts of basic polyether of N-cyclohexyl diethanolamine (molecular weight 890) are dehydrated for one hour at 110° C./12 mm. Hg. The product is then allowed to react for 45 minutes at 85 to 90° C. while stirring with 93.8 parts of diphenylmethane-4,4'-diisocyanate. The resulting NCO-pre-adduct is dissolved with intensive stirring in 954 parts of dimethyl formamide ($H_2O$-content 0.017%), cooled to 50° C. and mixed with 3.8 parts of water.

After some 5 to 6 hours at 50° C., the solution reaches the viscosity required for spinning. Further reaction is stopped by adding 2.5 parts of water to the elastomer solution and cooling it to room temperature. Solids content of the elastomer solution approx. 27%.

EXAMPLE 3

250 parts of the dehydrated polyester described in Example 1 are mixed at 90° C. while stirring with 93.8 parts of diphenylmethane-4,4'-diisocyanate. After 45 minutes at 90 to 95° C., the resulting polyester diisocyanate ample 1 are mixed while stirring at 90° C. with 93.8 parts of diphenylmethane-4,4'-diisocyanate. After 45 minutes at 90 to 95° C., the resulting polyester diisocyanate adduct is dissolved with a solution of 948 parts of dimethyl formamide, 4.07 parts of water and 40 parts of the solution, described below, of the basic polyether quaternised with p-toluene sulphonic acid methyl ester. The viscosity required for spinning is reached after a few hours at a reaction temperature of 50° C. Further reaction is inhibited by the addition of 2.5 parts of water. The elastomer solution has a solids content of approximately 27%.

Quaternisation of the basic polyether with p-toluene sulphonic acid methyl ester.

30 parts of a basic polyether of N-methyl-bis-β-hydroxy propylamine and 1,6-hexane diol (molar ratio 1:1; molecular weight 1600) and 19.5 parts of p-toluene sulphonic acid methyl ester are dissolved in 49.5 parts of dimethyl formamide. The reaction solution is heated for 8 hours at 80 to 85° C. in the presence of nitrogen and then slowly cooled to room temperature. The solution has a solids content of 50%. Approximately 80% of the tertiary nitrogen atoms are quaternised with p-toluene sulphonic acid methyl ester. According, 40 parts of the solution contain 42.5 mvals. of quaternary nitrogen and 10.5 mvals. of tertiary nitrogen.

EXAMPLE 5

250 parts of the dehydrated polyester described in Example 1 are allowed to react for 45 minutes at 90 to 95° C., while stirring with 93.8 parts of diphenylmethane-4,4'-diisocyanate to form the polyester diisocyanate adduct.

(a) The NCO-containing adduct is dissolved in 944 parts of dimethyl formamide ($H_2O$-content 0.012%) and then mixed with 62.5 parts of the solution described below of the basic polyether quaternised with 1,3-propane sultone (30% of the nitrogen atoms), and 3.8 parts of water. The required spinning viscosity is reached after a few hours at a reaction temperature of 50° C. during which $CO_2$ is given off. Further reaction is inhibited by the addition of 1.5 parts of water. The elastomer solution has a solids content of approx. 27%.

Quaternisation of the basic polyether with 1,3-propane sultone: 50 parts of the basic polyether of N-methyl-bis-β-hydroxypropyl amine and 1,6-hexane diol (molar ratio 1:1; molecular weight 1600) and 8 g. of 1,3-propane sultone are dissolved in 87 parts of dimethyl formamide. Quaternisation is terminated after 10 hours at 60° C. The solution has a solids content of 40%. Approximately 30% of the tertiary nitrogen atoms are quaternised with 1,3-propane sultone. Accordingly, 62.5 parts of the reaction solution contain 94 mvals. of tertiary plus quaternary nitrogen and 28.2 mvals. of $SO_3$.

(b) The NCO-containing adduct which has a temperature of 92° C. is dissolved in 927 parts of dimethyl formamide ($H_2O$-content 0.012%) and then mixed with 60 parts of the solution described below of the basic polyether quaternised with 1,3-propane sultone (60% of the nitrogen atoms), and 3.8 parts of water. The required spinning viscosity is reached after a few hours at a reaction temperature of 50° C., during which time $CO_2$ is given off. Further reaction is inhibited by the addition of one part of water. The solution has a solids content of approximately 27%.

Quaternisation of the basic polyether with 1,3-propane sultone.

Following the procedure of Example 5(a), 50 parts of the basic polyether of N-methyl-bis-β-hydroxy propyl amine (molecular weight 900) are quaternised with 27.8 parts of 1,3-propane sultone in 156 parts of dimethyl formamide. Solids content of the solution 33⅓%. Approximately 60% of the tertiary nitrogen atoms are quaternised with 1,3-propane sultone. Accordingly, 25 parts of the solution contain 97.6 mvals. of tertiary and quaternary nitrogen and 58.5 mvals. of $SO_3$.

EXAMPLE 6

250 parts of the dehydrated polyester described in Example 1 are reacted for 60 minutes at 105 to 110° C. with 77.8 parts of diphenyl methane-4,4'-diisocyanate.

The NCO-containing adduct is then dissolved in the solution of 10 parts of the basic polyether of N-methyl-bis-β-hydroxypropyl amine (molecular weight 900) and 40 parts of 1,5-naphthylene-bis-β-hydroxy ethyl ether in 800 parts of dimethyl formamide. The solution is allowed to react for 10 minutes at a temperature of between 65 and 70° C. and is then additionally diluted with 330 parts of dimethyl formamide, as a result of which the temperature falls to 55° C. After 20 minutes at 50 to 60° C., the reaction solution is rapidly cooled to 15° C. 15 to 20 hours later, the solution has reached the viscosity required for spinning. Solids content of the solution approximately 25%.

EXAMPLE 7

250 parts of the dehydrated polyester described in Example 1 are reacted for 45 minutes at 85 to 90° C. with 56.25 parts of diphenyl methane-4,4'-diisocyanate. The NCO-containing adduct is rapidly dissolved with 550 parts of dimethyl formamide ($H_2O$-content 0.012%) and then mixed with 15 parts of the basic polyether of N - methyl - bis - β - hydroxypropyl amine and 1,6-hexane diol (molar ratio 1:1; molecular weight 1600). After 60 minutes at 50° C., the reaction solution (temperature 35 to 40° C.) is allowed to drip over a period of 30 minutes with intensive stirring into a solution at 70° C. of 8.2 parts of carbodihydrazide in 343 parts of dimethyl formamide. Following the addition of 0.5 parts of hexamethylene-1,6-diisocyanate, a highly viscous elastomer solution is obtained. It has a solids content of 27%.

EXAMPLE 8

Following dehydration, 250 parts of the polyester described in Example 1 and 15 parts of the basic polyether of N-cyclohexyl ethanolamine (molecular weight 890) are reacted for 60 minutes at 95 to 100° C. with 56.25 parts of diphenyl methane-4,4'-diisocyanate.

The NCO-containing pre-polymer is rapidly dissolved in 330 parts of dimethyl formamide (temp. 65° C.) and added dropwise over a period of 15 minutes to a solution heated to 70° C. 7.48 parts of carbodihydrazide in 560 parts of dimethyl formamide. The viscous solution is left to cool slowly, after which its viscosity is further increased by the addition of 0.6 g. of 1,6-hexamethylene diisocyanate. Solids content of the solution 27%.

EXAMPLE 9

250 parts of the dehydrated polyester described in Example 1 are reacted for 45 minutes at 85 to 90° C. while stirring with 68.8 parts of diphenyl methane-4,4'-diisocyanate. The hot NCO-containing pre-adduct is dissolved with a solution of 20 parts of the basic polyether of N-methyl-bis-β-hydroxy propyl amine and 1,6-hexane diol (molar ratio 1:1; molecular weight 1600) in 600 parts of dimethyl formamide ($H_2O$-content 0.012%) and the resulting solution kept at a reaction temperature of 50 to 55° C. for 30 minutes.

The warm reaction solution is then added dropwise over a period of approximately 1 hour at 40 to 45° C. to an intensively stirred solution of 6.5 parts of hydrazine hydrate in 336 parts of dimethyl formamide. The required spinning viscosity is obtained some three hours later after the gradual addition of 0.6 part of 1,6-hexamethylene diisocyanate. Solids content of the solution approx. 27%.

EXAMPLE 10

250 parts of the dehydrated polyester described in Example 1 are reacted for 60 minutes at 85 to 90° C. while stirring with 62.5 parts of diphenylmethane-4,4'-diisocyanate. The NCO-containing pre-adduct is dissolved with 670 parts of dimethyl formamide ($H_2O$-content 0.012%) and then mixed with 15 parts of the basic polyether of N-methyl-bis-β-hydroxy propyl amine and 1,6-hexane diol (molar ratio 1:1; molecular weight 1600). After 45 minutes at 50° C., the reaction solution is rapidly cooled to 30° C.

The reaction solution is then added dropwise at 25 to 30° C. with intensive stirring to a solution of 6.95 parts of ethylene diamine in 235 parts of dimethyl formamide, and the required spinning viscosity adjusted by the addition of 0.7 part of 1,6-hexamethylene diisocyanate. Solids contents of the solution approx. 27%.

EXAMPLE 11

Spinning and dyeing tests

In order to prepare elastic filaments, the elastomer solutions described in Examples 1 to 10, following from the removal from them in vacuo of any gases and filtration, are spun through spinnerets with nozzle diameters of between 0.1 and 0.2 mm., into an aqueous precipitation bath with a DMF content of 2 to 5% at a bath temperature of 60° C., and are then drawn off at a rate of preferably 20 metres per minute and then dried. The resulting filaments exhibit the physical properties set out in Table II:

For dyeing, the specimens are introduced into the dye bath containing the dyes specified in Table II under the conditions likewise specified in this table such as pH and dye content, based on the weight of the elastomer specimen. After the dyeing liquor or solution has been slowly heated to 95 to 98° C., dyeing is completed at this temperature for about 1 hour until the liquor has lost practically all its colour. After drying, the brilliant, generally deep shades listed in Table II are obtained which are distinguished, for example by their fastness both to wet processing and to perspiration.

If polyamide fibres are simultaneously dyed in the same dye baths, outstanding colour watching is obtained between the elastomer and the hard fibres in cases where acid dyes are used. In cases where basic dyes are used, as in Examples 5(a) and 5(b) dyeing may also be carried out in the presence of polyacrylonitrile fibres in which case the resulting colours are again well matched.

EXAMPLE 12

Even with viscosities of between 500 and 1200 poises, the filtered solutions described in Examples 1 to 10, from which any gases have been removed in vacuo, can be spun by the dry spinning process into continuous elastomeric filaments which also exhibit a high affinity for dyes.

A filtered solution prepared in accordance with Example 2(b) which is pigmented with 4.5% of $TiO_2$ and from which any gases have been removed, is spun through a spinneret into a shaft heated to 200° C. into which air pre-heated to 180° C. is blown at the spinneret end. The filaments issuing from the end of the shaft are drawn off at a rate of 300 metres per minute, provided with an oily preparation and then reeled.

For dyeing, a length of fibre is initially washed in water at 50° C. with a surface-active agent prepared from alkyl sulphonates or ethoxylated alkyl phenols, re-washed with clear water and then heated to 98° C. in a pH 4.5 dye bath containing 1% of Telon fast red (C.I. Suppl., p. 1084, Acid dye) and dyed for one hour until practically all the dye has disappeared. After drying, the filaments exhibit a deep red, brilliant shade and are fast both to wet processing and to perspiration.

The dyed fibre retains its outstanding properties:

Strength: 0.9 g./den.
Elongation: 580%
Permanent elongation 3×900%, 30 seconds: 12%
300 modulus: 190 mg./den.

(2) a substantially linear polymeric glycol having a hydroxyl number of from 35 to 125;
(B) a first chain extender having a molecular weight below 500 selected from water, glycols, aminoalcohols, diamines, dihydrazides and hydrazine; and
(C) a second chain extender comprising a linear polyether glycol having oxygen and tertiary nitrogen atoms in the chain and a molecular weight of from 500 to 15,000 and being the product of condensing N,N - bis - β - hydroxyalkyl derivatives of primary amines or N,N' - bis - β - hydroxyalkyl derivatives of secondary diamines said second chain-extender being present in an amount of 1–50 mole percent based on the total chain extenders present.

2. The polyurethane of claim 1 wherein said second chain extender is the product of co-condensing N,N-bis-β-hydroxyalkyl derivatives of monovalent primary amines or N,N'-bis-β-hydroxyalkyl derivatives of bivalent secondary amines with a diol.

3. The polyurethane of claim 1 wherein up to 90% of the tertiary nitrogen atoms present in the polyurethane chain are quaternized with monofunctional sulphuric acid ester, aromatic sulphonic acid ester, aliphatic sultone or alkyl halide.

4. The polyurethane of claim 2 wherein up to 90% of the tertiary nitrogen atoms present in the polyurethane chain are quaternized with monofunctional sulphuric acid ester, aromatic sulphonic acid ester, aliphatic sultone or alkyl halide.

5. The polyurethane of claim 2 wherein said second chain extender is a condensation product of N-methyl-bis-β-hydroxypropyl amine or N-cyclohexyl diethanolamine.

TABLE II

| Solution according to Example | mVals tert. N[c] | mVals quat. N[c] | mVals $SO_3$ | Thickness, den. | Strength, g/den. | Elongation, percent | Permanent[a] elongation, percent | Modulus 300%, 1 mg./den.[3] | Dye[b] | Colour Index | pH | Appearance of the dyed filaments. |
|---|---|---|---|---|---|---|---|---|---|---|---|---|
| 1a | 323 | | | 420 | 0.52 | 470 | 15 | 160/100 | 1.5% Telon fast red ER. | C.I. (Supplement) S. 1084, acid dye. | 4.5 | Brilliant deep scarlet. |
| 1b | 171 | | | 420 | 0.53 | 480 | 13 | 150/90 | 1.0% Telon fast red ER. | do | 4.5 | Brilliant deep red. |
| 1c | 218 | | | 420 | 0.61 | 450 | 15 | 160/90 | do | do | 4.5 | Do. |
| 1d | 269 | | | 420 | 0.60 | 420 | 12 | 140/80 | 1.0% Telon fast blue RR. | do | 4.5 | Brilliant deep blue. |
| 2a | 247 | | | 420 | 0.53 | 500 | 14 | 140/80 | 3.0% Supranol black VLG. | C.I. acid black 26, 1385 vol. 1. | 6.0 | Brilliant deep black. |
| 2b | 247 | | | 420 | 0.51 | 520 | 14 | 140/80 | do | do | 6.0 | Do. |
| 3 | 14 | 149 | | 280 | 0.48 | 480 | 16 | 170/120 | 1.0% Telon fast red ER. | C.I. (supplement) S. 1084, acid dye. | 3.5 | Brilliant deep red. |
| 4 | 29.4 | 118 | | 280 | 0.45 | 500 | 16 | 180/120 | do | do | 3.5 | Do. |
| 5a | 259 | 259 | 78 | 280 | 0.45 | 480 | 12 | 160/90 | 1.0% Astrazon blue BG. | C.I. basic blue, 3, 1639, vol. 1. | 6.5 | Brilliant deep blue. |
| 5b | 273 | 273 | 163 | 280 | 0.42 | 500 | 13 | 160/80 | 3.0% Astrazon black WRL. | C.I. (supplement) S. 174. | 6.5 | Brilliant deep black. |
| 6 | 200 | | | 280 | 0.38 | 520 | 17 | 140/60 | 2.0% Supranol fast yellow 6G. | C.I. acid yellow 142 (supplement) S. 11. | 6.0 | Brilliant deep yellow. |
| 7 | 198 | | | 420 | 0.51 | 500 | 15 | 160/100 | 1.0% Telon light yellow G. | C.I. (supplement S. 1084, acid dye. | 4.0 | Brilliant yellow. |
| 8 | 265 | | | 420 | 0.49 | 500 | 16 | 170/110 | 1.5% Telon fast blue RR. | do | 5.0 | Brilliant deep blue. |
| 9 | 251 | | | 420 | 0.55 | 480 | 15 | 160/110 | 1.0% Telon light blue RR. | do | 4.0 | Brilliant blue. |
| 10 | 196 | | | 420 | 0.50 | 500 | 15 | 160/100 | 1.0% Telon fast red ER. | do | 4.5 | Brilliant deep red. |

[a] After stretching and relaxing 3 times at 300% elongation, after a recovery interval of 30 secs.
[b] Percent dyed, based on weight of elastomer.
[c] Per kg. of elastomer.

What we claim is:

1. A segmented polyurethane suitable for the formation of elastic filaments formed by the reaction of
   (A) an NCO terminated prepolymer of
      (1) an organic diisocyanate, and 6. The polyurethane of claim 2 wherein said diol is triethylene glycol or 1,6-hexane diol.

7. The polyurethane of claim 3 wherein said quaternizing agent is dimethyl sulphate or 1,3-propane sultone.

8. The polyurethane of claim 1 wherein said first chain extending agent is water, carbodihydrazide, hydrazine hydrate, ethylene diamine or 1,5-naphthylene-bis-β-hydroxy ethylether.

9. The polyurethane of claim 1 wherein said second chain extender is present in an amount such that the polyurethane contains from about 25 to 400 milliequivalents of tertiary and quaternary nitrogen atoms per kilogram.

10. The polyurethane of claim 3 wherein the polyurethane polymer contains from about 2 to about 300 milliequivalents per kilogram of $SO_3$ groups linked to quaternary nitrogen atoms through alkylene groups.

References Cited

UNITED STATES PATENTS

| | | | |
|---|---|---|---|
| 2,929,800 | 3/1960 | Hill, Jr. | 260—32.6(N) |
| 2,953,533 | 9/1960 | Khawam | 260—77.5(AQ) |
| 3,094,434 | 6/1963 | Chapman et al. | 260—77.5(AQ) |
| 3,232,908 | 2/1966 | Oertel et al. | 260—32.6(N) |
| 3,248,371 | 4/1966 | Damusis | 260—77.5(AQ) |
| 3,264,268 | 8/1966 | Muller et al. | 260—77.5(AQ) |
| 3,294,752 | 12/1966 | Wilkinson | 260—77.5(Q) |
| 3,401,151 | 9/1968 | Wieden | 260—77.5AQ |

FOREIGN PATENTS

| | | | |
|---|---|---|---|
| 1,156,977 | 11/1963 | Germany | 260—77.5(Q) |
| 1,379,133 | 10/1964 | France | 260—77.5(Q) |

MORRIS LIEBMAN, Primary Examiner

P. R. MICHL, Assistant Examiner

U.S. Cl. X.R.

260—30.4, 32.6, 77.5